United States Patent Office 2,697,081
Patented Dec. 14, 1954

2,697,081
THERMOSETTING MOLDING COMPOUNDS COMPRISING BARK COMPONENTS

Clark C. Heritage, Tacoma, Wash., assignor to Weyerhaeuser Timber Company, Tacoma, Wash., a corporation of Washington No Drawing. Application October 24, 1952, Serial No. 316,807

7 Claims. (Cl. 260—17.2)

This invention relates to the manufacture of plastics, and has particular reference to a thermosetting molding compound comprising selected components of the bark of trees and a thermosetting aldehydic resin for the manufacture of infusible thermoset masses, and has practical reference to the necessary composition of the resin component in such compound.

The bark of trees represents a large economical and attractive source of easily comminuted material for use in the manufacture of molding compounds. Bark is composed essentially of three components, namely, cork, sclerenchyma tissue consisting either of fiber or stone cells, and parenchyma tissue which, in finely comminuted state, often is referred to as bark powder. It has been discovered that these separate tissue components of bark have different physical and chemical characteristics which distinguish each of them from the others, and that each of said components contributes properties to a molding compound differing in accordance with the physical and chemical constituents of the component.

Cork is that component of bark which, when highly comminuted, will float on a benzene-carbon tetrachloride mixture having a density of 1.24 g./cc. Fiber is that component of bark which, when highly comminuted to completely separate it from other components of the bark, will sink in a benzene-carbon tetrachloride mixture having a density of 1.45/g. cc. but will float on such a mixture having a density of 1.47 g./cc. The parenchyma tissue may be considered to be the remaining portion of the bark after removal of the cork and fiber.

Any one or a carefully blended combination of bark components may be selected as an ingredient of molding compounds having predetermined and reproducible properties. Whole bark, however, is unsuited for use as a satisfactory filler because of the variation of properties which the several components of the bark impart to the compound. For example, because of their thermoplasticity, bark fractions which are rich in cork, or which are rich in parenchyma tissue or powder, are unsuited for use as thermosetting molding compound fillers. The fiber component is an excellent filler for thermosetting molding compounds, and imparts excellent strength and impact resistance to the molded piece; and of particular importance because it has a low specific surface and is difficult to impregnate with resin. These latter properties make possible the manufacture of molding compounds having the ability to impart outstanding strength properties to infusible thermoset masses.

Mechanical separation of pure components of bark has not been commercially achieved; but mixtures which are rich in each of the several components of the bark have been and are being manufactured. It may be stated, as a matter of fact, that insofar as known to the assignee of the patents to Anway, No. 2,437,672; Hatch, No. 2,444,929; and Pauley, No. 2,446,551, cited as references in the parent application, no bark fraction of absolute purity has ever been produced on a commercial scale. Contamination of each of the several products by small amounts of other tissues has been impossible to prevent in a bark reduction plant; and in this application reference to the bark components will be understood to refer to commercial grades of products as produced in a bark reduction plant. By way of example but not of limitation, the cork component may be considered to be substantially 90% pure and ground to pass through a 40 mesh screen; the fiber recovered as a product of from 80% to 86% purity and ground to pass through a 100 mesh screen and to be retained on a 200 mesh screen; and the bark powder to be a product of approximately 75% purity and ground to pass through a 200 mesh screen and approximately 90% thereof will pass through a 325 mesh screen.

Comminuted whole bark, that is, bark which has been finely comminuted but from which no separation of components has taken place, is completely unsuited for use as a filler for thermosetting molding compounds, due to the fact that the uncontrolled amounts of cork and powder components so affect the flow and cure properties of the molding compound that flow of the compound under pressure and appearance of the molded piece are unsatisfactory and difficult to control. Acceptable formulations, accidentally achieved, cannot be reproduced with any degree of certainty with the use of whole bark.

Molding compounds embodying the invention may comprise either one-step or two-step thermosetting resins, and these may be either liquid or solid. A significant advantage of the instant invention lies in the use of relatively low percentages of resin solids. It is conventional in the art relating to thermosetting molding compound manufacture to use a minimum of 40% resin solids, and frequently resin usages are of the order of 50% to 70% of the composition. The invention teaches that with the use of fillers derived from bark, acceptable molding compounds are produced with as little as 15% to 40% resin solids, based on the solids content of the composition, and that general purpose competitive molding compounds are made in which the resin solids content is between 25% and 35%. The ability to use such relatively low resin content is due to the unique properties of the filler employed.

Regardless of the type of resin, however, it is required that the resin be produced by use of a greater than normal stoichiometric proportion of aldehyde in order to provide sufficient active methylenic groups to supply the requirements of the reactable material in the resin such as phenol, resorcinol, cresol or urea, and also the requirements of the aldehyde-reactive constituents of the filler. This is probably explained by the fact that bark components contain phenol-like substances which are aldehyde-reactive. For example, if the aldehyde to phenol ratio in a phenolic resin employed is such that the aldehyde content is sufficient only to cause a minimum of cross linking in the set-up polymer, and if reactive bodies in the filler react with a portion of this aldehyde, then there will be insufficient aldehyde present to completely thermoset the resin. The result is a molding compound which is more nearly thermoplastic than thermosetting. In other words, there must be sufficient aldehyde present in the resin both to react with the reactive bodies of the filler and to provide methylenic cross linkage for the resin. It is for this reason that the use of low percentages of resin solids makes certain specified ingredients of the molding compound critical. To illustrate in a comparative manner, the use of high percentages of resin solids causes the thermoplasticity of the compound to persist over sufficiently long periods of time to permit the molding of complex contoured or deep draw objects before the compound reaches the infusible state. Also, the actual chemical composition of the resin is of lesser importance when the resin is a major constituent of the molding compound. Where, however, the resin solids content of the molding compound is exceptionally low, as in molding compounds embodying the instant invention, complete cross linking of the polymer must be achieved by very careful formulation. Applicant has discovered that fillers derived from bark have a tendency to react with aldehyde to form complex chemical substances. For this reason, the mechanism whereby mixtures of aldehyde-reactable-material and aldehydes, including the bark filler, react to form insoluble thermoset masses depends upon the presence of a molar ratio of aldehyde to the aldehyde-reactable-content of the resin which is greater than unity in order to provide sufficient methylenic radicals for the cross linking of the polymer into a three dimensional matrix. If the aforementioned ratio is less than unity, the phenol-aldehyde polymer, for example, will not become three dimensional, and consequently remains perpetually as a thermoplastic material. Because of the aldehyde reactivity of the bark filler, a resin which of itself contains only sufficient aldehyde to become thermoset will remain thermoplastic, or become only partially thermoset, for the reason that a part of the aldehyde is used to satisfy the requirements of the bark filler.

The instant invention embodies the discovery that desirable molding compounds may be made with a liquid one-step phenol-formaldehyde resin in which the ratio of aldehyde to phenol is greater than 1.1:1. The cost factor of a molding compound embodying the invention is two-fold: The liquid one-step resin is less expensive than one-step or two-step solid resins conventionally used in the manufacture of molding compounds, and, when employed in molding compound formulations embodying fillers derived from bark, the resin usage is reduced from customary usages of 50% to 70% of the formulation to from 15% to 35% of the formulation. Notwithstanding the very considerable reduction in resin usage, molding compounds embodying the invention are capable of producing molded pieces having properties equal to or superior to those molded from compounds containing the solid resins.

It is a principal object of the invention to provide a molding compound for the manufacture of infusible thermoset masses having a high percentage of filler derived from bark and a substantially lower-than-common practice percentage of a thermosetting resin.

It is a further object of the invention to provide a molding compound having a high percentage of filler derived from bark by use of a thermosetting resin having a molar ratio of aldehyde to aldehyde-reactive-material greater than unity to insure sufficient methylenic radicals for the cross linking of the polymer into a three-dimensional matrix.

It is a further object of the invention to provide in a process for the manufacture of thermosetting molding compounds the step of admixing a filler derived from bark and a thermosetting resin having a molar ratio of aldehyde to phenol greater than unity.

It is a further object of the invention to provide a thermosetting molding compound comprising a liquid one-step resin in which the molar ratio of aldehyde to phenol is greater than unity, and a filler consisting of substantially pure constituents of bark, each being separated from the other bark constituents and finely comminuted, and used, either singly or in carefully blended combinations thereof, to produce the desired properties of flow, bulk density, moisture content, and pH, and capable of imparting to the molded piece properties of exceptional strength, excellent finish, handleability, water resistance and releasability.

It is a further object of the invention to provide a thermosetting molding compound comprising a thermosetting resin having a molar ratio of aldehyde to phenol greater than unity, and a filler consisting of substantially pure constituents of bark, each being separated from the other bark constituents and finely comminuted, and used either singly or in carefully blended combinations thereof.

It is a further object of the invention to provide a molding compound having a high percentage of filler derived from bark and not to exceed 40% of resin solids, based on the solids content of the compound.

It is a further object of the invention to provide for the use in a molding compound of a liquid one-step resin in which the molar ratio of aldehyde to phenol is greater than 1.1:1.

It is also an object of the invention to provide a thermosetting molding compound having a desirably high bulk density and which is capable of producing molded articles having high torque and/or impact strength.

Various other and ancillary objects and advantages of the present invention will become apparent from the following description and explanation of a preferred embodiment of the invention.

The molding compounds of the instant invention principally comprise either a one-step or a two-step thermosetting resin in which the molar ratio of aldehyde to phenol is greater than 1.1:1, and a finely comminuted filler derived from the bark of trees and used, either singly or in carefully blended combinations thereof, to produce molding compounds having desired properties of flow, bulk density, moisture content and pH. Because of the cost factor involved, it is preferred to use a liquid one-step thermosetting resin. The molding compound may also comprise, as needed, minor amounts of flow promoter, catalyst, stain suppressor, stick suppressor, lubricant and dye. The molding compounds of the invention are adaptable for use in compression molding, transfer molding, deep draw molding, and general purpose molding, and are capable of imparting to the molded piece properties of exceptional strength, excellent finish, handleability, water resistance, and releasability.

A typical formulation embodying the invention is as follows:

| | Per cent |
|---|---|
| Resin solids | 30 |
| Ground sclerenchyma tissue (fiber) of bark | 65 |
| Calcium oxide | 2 |
| Dye (Nubian resin black) | 1 |
| Zinc stearate | 0.5 |
| Coumarone indene resin (flow promoter) | 1.75 |
| Borax | 0.75 |

Other formulations appear in the several tables which appear throughout the specification.

In the manufacture of a molding compound it is one of the preferred procedures to mix together in a dry state the filler material, a lubricant such as zinc stearate, a catalyst and the dye. As the catalyst there may be used an alkaline compound selected from the group consisting of magnesium oxide, calcium oxide, calcium hydroxide, sodium tetraborate, zinc oxide and lead oxide, in an amount sufficient to confer upon the composition a pH between about 8.0 and about 10.5. These ingredients are combined by thorough blending for a period of 10 to 30 minutes before the addition of the liquid resin. The quantity of resin added is calculated on the basis of its solids content. Blending or premixing may be accomplished in a blade or Muller type mixer before compounding on the mixing rolls. The material is then rolled between hot rolls to complete the uniform mixing of the ingredients and to evaporate the water. The mixture is rolled for a period of from 20 to 120 seconds, depending upon the temperature of the rolls, the physical properties of the mixture, and the flow and cure properties desired in the finished compound. A certain amount of resin advancement is performed during the rolling process. The rolled sheets are removed from the rolls and ground to the desired particle size, after which the product is ready for use.

Of the three components of bark, namely, cork, fiber and powder, the fiber is the most desirable for use as a filler in a molding compound, for the reason that it imparts excellent strength and impact resistance to the molded piece, but more particularly because it has a low specific surface and is difficult to impregnate with resin. The sclerenchyma tissue of the Douglas fir is a hard cellulosic fiber of a spindly shape, varying in length from 0.0425 mm. to 0.210 mm., the average length being 0.111 mm. (median 0.112). Its high bulk density permits formulations with as low as 15% liquid phenolic resin. The molding compounds embodying the invention require less than the conventional content of resin solids, presumably due to the fact that the structure of the sclerenchyma is such as to render it essentially impervious to resin impregnation, and the resin remains on the surface of the filler particles and functions as a bonding agent and to promote flow, rather than being absorbed by the filler.

The use of pure fiber has a tendency to cause poor flow or cutoff because of its particle size. This tendency to reduce flow is overcome successfully by grinding the fiber. The particle size of 80/100 mesh screen provides good, and in some cases excellent, flow. Contrary to expectations, grinding of the fiber reduces strength of the molded piece but little, the average approximating 10%. Table I illustrates the effect on strength properties of grinding the bark fiber or bast fiber:

TABLE I

*Influence of fiber grinding on strength*

|  | 22% Resin | | | 28% Resin | | |
| --- | --- | --- | --- | --- | --- | --- |
|  | Douglas fir bark fiber | | | | | |
|  | As is | Micro. .010″ | Ball Milled | As is | Micro. 0.010″ | Ball Milled |
| S-628- | 386 | 395 | 396 | 428 | 369 | 370 |
| Roll Time (Sec. at 220° F.) | 10 | 15 | 10 | 10 | 75 | 75 |
| Flow (ccl) | 30 | 31 | 47 | 18 | 23 | 34 |
| Cure | 1.5 | <3 | <2 | <3 | <3 | <3 |
| Stain | 3 | 3 | 2 | 3 | | |
| Bulk Density | 45.4 | | 50.3 | | | |
| pH | 9.6 | 9.9 | 9.7 | 9.7 | | |
| Moisture Content | 2.5 | 2.2 | 2.9 | 4.1 | | |
| Flex | 9,400 | 10,500 | 9,900 | 9,900 | 10,900 | 10,700 |
| Tens | 7,400 | 7,500 | 7,300 | 5,600 | | |
| Impact | .32 | .49 | .34 | .40 | .36 | .39 |
| El. Mod.×10⁵ | 10.7 | 10.2 | 9.5 | 10.3 | | |
| Defl | .044 | .054 | .056 | .052 | | |
| Shrink | .0023 | .0040 | .0057 | .0039 | | |
| Sp. Gr | 1.39 | 1.40 | 1.40 | | 1.37 | 1.37 |
| pH | 9.7 | 10.2 | 10.2 | 9.8 | | |

Formulation:

Pure fiber (balance)
One-step liquid phenol-formaldehyde resin (see above)
5% calcium stearate
3% lime Tests indicate that the lignin, wax, dihydroquercetin and other phenolic-like content of the bark filler react with the aldehyde to form complex chemical substances. Of the commercial cork fraction, approximately 86% is of such chemical nature that it would be expected to react with the aldehyde. Of the purest commercial grade of bark powder (parenchyma tissue) approximately 75% will react with the aldehyde, and of the purest commercial grade of fiber product available, 36% is aldehyde reactive. It has been found that thermosetting resins containing a molar ratio of aldehyde to phenol as great as 1.8:1 do not contain sufficient aldehyde to satisfy the requirements of both the filler and the resin to produce satisfactory thermosetting compounds when either substantially pure cork or substantially pure parenchyma tissue is used as the filler. For these reasons, high percentages of cork or parenchyma in the bark filler ordinarily result in the production of molding compounds having tendencies to remain thermoplastic. However, by careful formulation, compounds containing predetermined amounts of cork and/or powder admixed with the sclerenchyma in amounts having a definite relation to the phenol/aldehyde ratio of the resin will produce desired properties of thermoplasticity, flow properties, cure and the like, as shown hereinafter in Table II.

A one-step resin is one which contains sufficient aldehyde or other methylenic cross linking materials to accomplish complete cross linking of the resin into a three dimensional structure by polymerization. If insufficient aldehyde or other cross linking material is present the resin will polymerize to form long chain-like but not cross linked polymers. Such polymers remain fusible, and the material is thermoplastic.

A two-step resin is a thermoplastic material deficient in aldehyde to which aldehyde or other cross linking material is added just prior to compounding. Two-step resins may easily be prepared in the dry state without cross linking taking place. The cross linking material conventionally used with two-step resins is hexamethylenetetramine.

It is a common practice to add hexamethylenetetramine to solid two-step resins prior to molding in order to produce a thermoset article. Applicant's experience has been that approximately 5% more "hexa" is required to produce a thermoset piece when bark components rather than wood flour are used in conjunction with solid two-step resins. As the amount of resin increases relative to the amount of filler, there is less requirement for amounts of hexamethylenetetramine over and above the conventional 5% of the weight of the resin. By the same token, when a molding compound containing bark filler and a one-step resin is prepared, the stoichiometric proportion of aldehyde to resin must increase as the resin to filler ratio decreases. In the formulation of general purpose molding compounds comprising bark sclerenchyma and from 15% to 40% of a one-step phenolic resin, it is preferred that the molar ratio of aldehyde to phenol be greater than 1.4:1.

In general, the resin imparts to the molding compound properties affecting flow, cure, moldability and cost, these properties being altered as desired by appropriate changes in formulation or processing. For example, it is the teaching of the invention that when the molding compound embodies fillers derived from bark, as little as 15% to 40% resin solids may be used, providing the molar ratio of aldehyde to phenol in the resin is greater than 1.1:1, and preferably is greater than 1.4:1. One of the preferred types of resin is what is commonly known in the plastics industry as a casting resin. The use of casting resins in the production of thermosetting molding compounds designed to be molded by conventional processes is in itself unique and is possible only by the discovery that when compounded with reactive fractions of bark the resin reacts with the filler to produce thermosetting compounds. The high bulk density of bark fiber makes possible the use of liquid one-step phenol-formaldehyde resins, including casting resins, thus promoting uniform mixing of the liquid resin and the sclerenchyma tissue at a low resin usage with a rapid and uniform sheeting of the resulting mix on the compounding rolls, an operation which is difficult to achieve with fillers of bulky wood flour, cotton floc and ground walnut shell. It is preferred that a liquid phenol-formaldehyde resin for use in the manufacture of molding compounds embodying the instant invention conform to the following approximate specifications:

| | |
| --- | --- |
| Non-volatiles (per cent) | 77–85 |
| Viscosity (cps. at 25° C.) | 20,000–100,000 |
| Ash, maximum value (per cent) | 1 |
| pH | 8.0–9.0 |
| Hot plate cure (sec. at 300° F.) | 75–120 |
| Free formaldehyde (per cent) | 0.1–0.8 |

A molding compound may be made with as little as 15% resin solids and as high as 80% bark products. In the following Table I are shown a number of molding compounds having a resin solids content varying between 15% and 40% and in which the amount of bark filler varies between 80% and 55%. The table shows the formulations of the several compounds; the conditions under which each was processed; the properties of the finished compounds, and the properties of the molded piece. The resin employed was a liquid one-step phenol-formaldehyde resin having an aldehyde to phenol ratio of 1.62 to 1.

The properties of compounds made with bark fiber and from 20% to 35% resin are equivalent to properties of molding compounds made with wood flour or walnut shell flour and from 40% to 50% resin. As the resin content of molding compounds embodying the instant invention is reduced from 50% to 30%, and bark fiber usage is correspondingly increased, only slight changes occur in molding compound properties. As the resin usage is decreased below from 25% to 30%, the resinous properties of the molding compound gradually diminish and the fibrous properties are gradually accentuated, i. e., flow decreases and becomes stiffer, staining becomes more evident, finish becomes duller, the surface slightly rougher, and water absorption increases. Strength is relatively unaffected except for impact which generally increases. However, even at 20% resin usage, these defects are not objectionable and are overcome by proper formulation. Flow can be improved by the use of cork or other flow promoters. Appearance can be improved by the use of parenchyma tissue, and staining can be reduced by the use of stain suppressors such as magnesium oxide.

TABLE II
Effect of resin usage

| Formulation (Percent O. D. Basis): | | | | | | |
|---|---|---|---|---|---|---|
| Resin 1-step liquid phenolic | 30 | 28 | 26 | 24 | 22 | 20 |
| Bark product (90% fiber) | 60.5 | 625. | 64.5 | 66.5 | 68.5 | 70.5 |
| Lime (hydrated) | 3.0 | 3.0 | 3.0 | 3.0 | 3.0 | 3.0 |
| MgO | 2.0 | 2.0 | 2.0 | 2.0 | 2.0 | 2.0 |
| Flow promoter (Velsicol AF-3) | 3.0 | 3.0 | 3.0 | 3.0 | 3.0 | 3.0 |
| Nubian Resin Black | 1.0 | 1.0 | 1.0 | 1.0 | 1.0 | 1.0 |
| Calcium Stearate | 0.5 | 0.5 | 0.5 | 0.5 | 0.5 | 0.5 |
| Processing: | | | | | | |
| Roll Temp., °F.— | | | | | | |
| fast roll | 175 | 175 | 175 | 175 | 175 | 175 |
| slow roll | 225 | 225 | 225 | 225 | 225 | 225 |
| Roll time (sec.) | 120 | 120 | 120 | 120 | 120 | 120 |
| Properties of Compound: | | | | | | |
| Flow (ASTM Cup/2000 p. s. i. g.) | 11 | 12 | 12 | 25 | 16 | 17 |
| Cure (Sec., ASTM Cup) | 90 | 75 | 75 | 75 | 75 | 75 |
| Cure (Hot Distortion, mils) | 71 | 50 | 57 | 29 | 24 | 33 |
| Bulk Density (gms./100 cc.) | 54.4 | 53.9 | 53.7 | 53.9 | 51.8 | 51.2 |
| Stain | 2.5 | 2.5 | 2.5 | 2.0 | 2.5 | 2.5 |
| pH | 8.7 | 8.7 | 8.7 | 8.9 | 8.9 | 9.0 |
| Moisture Content | 5.3 | 4.4 | | 3.9 | 4.6 | 4.4 |
| Properties of Molded Piece: | | | | | | |
| Transverse Strength (p. s. i.) | 12,300 | 12,200 | 11,500 | 11,100 | 11,300 | 11,000 |
| Impact (ft. lbs./in. of notch) | 0.35 | 0.34 | 0.33 | 0.33 | 0.35 | 0.32 |
| Torque (in. lbs.) (Baronet Cap) | 63 | 66 | 66 | 61 | 59 | 56 |
| Moisture absorption, total | 1.09 | 1.04 | 1.15 | 0.95 | 10.4 | 1.07 |

To assure satisfactory cure and quality of the product, it is necessary to maintain the compound at a high degree of alkalinity. The bark products are by nature slightly acidic. Aqueous suspensions have a pH of approximately 3.5. The high percentage of bark constituent in the formulation makes it necessary to include a base sufficient to neutralize excess bark acidity, to reduce or eliminate stain, and to maintain a satisfactory rate of cure, which might be retarded if the catalyst were partly neutralized by the bark. The preferred catalysts are found in the group of alkaline-earth oxides and hydroxides, although for special purposes other alkalies may be employed. The kind and amount of catalyst in the formulation influences the rate of setting of the molding compound, although to a lesser degree than the catalyst contained in the resin itself. Generally speaking, increasing the amount of a particular catalyst has only a minor influence on the cure, even in amounts up to 10%. There are occasional molding compounds in which an increase of the catalyst usage 1% or 2% reduces the cure time by as much as 50%. Usually, however, increasing the catalyst will reduce the cure time from 0 to from 12% to about 25%. The following alkaline compounds are preferred in the order of reference: magnesium oxide, calcium oxide, calcium hydroxide, sodium tetraborate, zinc oxide and lead oxide.

Cure is the reaction process whereby a molding compound becomes infusible and sets by means of complete polymerization and cross linking of the resin. The time required for this reaction is called the cure time. Cure time varies with (a) the molding temperature, (b) the size, thickness and shape of the molded piece, and (c) the molding compound formulation, particularly the type of resin, resin usage, type of catalyst and alkalinity, and the type of filler.

Molding compounds were prepared using commercially pure cork, fiber and parenchyma tissue, respectively, as the filler, with a basic formulation for each filler using solid two-step phenol-formaldehyde resin with added hexamethylenetetramine, as follows:

| Percent Resin | Percent Filler | Percent Lime | Percent Calcium Stearate |
|---|---|---|---|
| 35 | 61.5 | 3 | 0.5 |
| 28 | 68.5 | 3 | 0.5 |
| 22 | 74.5 | 3 | 0.5 |
| 15 | 81.5 | 3 | 0.5 |

It was found that molding compounds made of fiber cured, whereas those made of cork or parenchyma tissue did not cure, regardless of the fact that 2-step resin usage employed was within the conventional commercial limits. The compounds comprising cork or parenchyma tissue could be made to cure only by substituting bark fiber or wood flour for a large part of the cork or parenchyma tissue employed.

However, by careful blending of the several bark fractions and selection of resin, flow and cure properties of the molding compound, and strength and appearance of the molded piece, may be achieved as desired.

This application is a continuation-in-part of application Serial No. 239,407, filed July 30, 1951, by Clark C. Heritage, for Thermosetting Molding Compounds, now abandoned, said application being a continuation-in-part of application Serial No. 534,981, filed May 10, 1944, by Clark C. Heritage, for Molding Compounds, now abandoned.

Having now described my invention and in what manner the same may be used, what I claim as new and desire to protect by Letters Patent is:

1. A thermosetting molding composition consisting of the thermal reaction product of a mixture of finely comminuted tissue components derived from the bark of a coniferous tree consisting almost entirely of its bast fiber, and a thermosetting moldable phenol-formaldehyde resin in which the molar ratio of formaldehyde to phenol is greater than 1.4:1, said bark components comprising phenolic compounds reactive with methylol groups in said resin and being present in an amount sufficient to react with the methylol groups and form a thermosetting resin.

2. A thermosetting molding composition having the formulation described in claim 1 wherein the tissue components derived from the bark of trees consist almost entirely of bast fiber from Douglas fir bark.

3. A thermosetting molding composition having the formulation described in claim 1 wherein the thermosetting resin is a one-step phenol-formaldehyde liquid resin providing a resin solids content constituting from 15% to 40% of the molding composition.

4. A thermosetting molding composition consisting essentially of the reaction product of a mixture of finely comminuted tissue components derived from the bark of a coniferous tree consisting almost entirely of its bast fiber, a thermosetting phenol-formaldehyde resin in which the molar ratio of formaldehyde to phenol is greater than 1.4:1 and an alkaline compound catalyst selected from the group consisting of magnesium oxide, calcium oxide, calcium hydroxide, sodium tetraborate, zinc oxide and lead oxide in an amount sufficient to confer upon the composition a pH between about 8.0 and about 10.5.

5. A thermosetting molding composition consisting essentially of the reaction product of finely comminuted tissue components derived from the bark of a coniferous tree, consisting almost entirely of its bast fiber and a one-step phenol-formaldehyde resin in liquid form having a molar ratio of formaldehyde to phenol greater than 1.4:1, said tissue components of the bark comprising phenolic bodies reactive with aldehyde, said one-step phenol-formaldehyde liquid resin having sufficient methylol groups for the cross-linking of the polymer and for reaction with said phenolic bodies to provide a thermosetting resin.

6. A thermosetting molding composition having the formulation described in claim 5 wherein the thermosetting resin is a one-step phenol-formaldehyde liquid resin having a resin solids content constituting from 15% to 40% by weight of the molding composition and wherein the tissue components derived from the bark constitute from 55% to 80% by weight of the molding composition.

7. The process of making a thermosetting molding composition which consists essentially of reacting a thermosetting phenol-formaldehyde resin having a molar ratio of formaldehyde to phenol greater than 1.4:1 with finely comminuted tissue components derived from the bark of a coniferous tree, consisting almost entirely of its bast fiber whereby the formaldehyde in excess of that required for cross-linking of the polymer in said resin reacts with phenolic bodies found in the bark components to make a resinous product for increasing the resin content of said molding composition.

References Cited in the file of this patent

UNITED STATES PATENTS

| Number | Name | Date |
|---|---|---|
| 1,774,728 | McCoy | Aug. 6, 1918 |
| 1,455,762 | Howard | May 15, 1923 |
| 1,863,540 | Hurst | June 14, 1932 |
| 1,899,768 | Nevin | Feb. 28, 1933 |
| 2,078,269 | Nevin | Apr. 27, 1937 |
| 2,319,182 | Van der Pyl | May 11, 1943 |
| 2,326,569 | Rosenthal | Aug. 10, 1943 |
| 2,424,787 | Adams | July 29, 1947 |

OTHER REFERENCES

Porter: Chemical Engineering, July 1947, pages 159, 160 and 162.

Marple: Plastics (Chicago), August 1947, pages 44, 65, 66 and 67.

Robitschek: Phenolic Resins, pages 76, 77, 79, 81 and 92, Iliffe and Sons, London, England. Copy received in Patent Office March 12, 1950.